United States Patent

Weiner

[15] 3,679,904

[45] July 25, 1972

[54] MULTIPLE BEAM TRANSMISSIONS SYSTEM WITH IMPROVED CROSS-TALK REDUCTION

[72] Inventor: Daniel Weiner, Hazlet, N.J.

[73] Assignee: Bell Telephone Laboratories, Incorporated, Murray Hill, N.J.

[22] Filed: March 3, 1969

[21] Appl. No.: 803,739

[52] U.S. Cl. ..............................250/199, 332/7.5, 343/200, 179/15 AN

[51] Int. Cl. ..........................................................H04b 9/00

[58] Field of Search.....................250/199; 330/4.3; 332/7.5, 332/7.51; 179/15 AN

*Primary Examiner*—Benedict V. Safourek

*Attorney*—R. J. Guenther and Arthur J. Torsiglieri

[57] ABSTRACT

Improved cross-talk reduction with spatial multiplexing of a plurality of N beams in a beam transmission system comprising a sequence of confocally spaced lenses is accomplished by inserting saturable absorption cells in anti-nodal regions of the transmission system, at which regions the beams are spatially distinct. The beams are resolved at the output end into N separate beams. A similar arrangement can be employed using nonconfocally spaced lenses. In a pulse-code-modulation communication system, the saturable absorption cells sharpen the pulses time-wise as well as space-wise.

5 Claims, 3 Drawing Figures

INVENTOR
D. WEINER
BY Wilford L. Wisner
ATTORNEY

MULTIPLE BEAM TRANSMISSIONS SYSTEM WITH IMPROVED CROSS-TALK REDUCTION

BACKGROUND OF THE INVENTION

This invention relates to spatially-multiplexed optical transmission systems.

The advent of the laser as a source of highly coherent and monochromatic electromagnetic wave energy in the infrared, visible and ultraviolet portions of the frequency spectrum, hereafter to be referred to collectively as "optical" waves, makes possible the use of such waves as the carrier signal in a communication system. However, the utilization of optical waves in this manner is dependent upon the availability of an efficient transmission system.

Typical among the present-day proposals for sending optical waves over long distances are systems employing sequences of dielectric lenses, periscopic mirrors, dielectric waveguides and gas lenses. Characteristically, each of these systems contemplates the guidance of a single beam of wave energy along a single guide axis. In all of such systems, means are advantageously included for sensing when the beam axis is improperly oriented and for redirecting the beam along the guide axis.

As is readily evident, the cost of transmitting information along such a system would be significantly reduced if, instead of utilizing the system in a manner to guide a single beam, a plurality of beams could be simultaneously transmitted therealong.

As previously proposed in the copending patent application of D. Gloge et al, Ser. No. 761,954, filed Sept. 24, 1968, now U.S. Pat. No. 3,574,439, and assigned to the assignee hereof, the capacity of a beam waveguide is increased by spatially multiplexing a plurality of beams in such a way that they are resolvable at the output end of the system. Wave guidance is accomplished by means of a sequence of lenses that are large compared to the diameter of the individual beams. At the input end of the system, means are provided for organizing the $N$ beams to be multiplexed into $q$ groups of $p$ beams each, and for directing one beam from each of said groups onto one of $p$ separate regions of the first lens in the sequence, where $p$ and $q$ are integers greater than one, and $p \times q = N$.

At the output end of the waveguide, means are provided for resolving the beams into $N$ separate beams, directed along $N$ separate wavepaths.

It is a feature of that proposal that the beams are not confined to the center of the wavepath, but utilize the entire cross-sectional area of the waveguiding structure. Nevertheless, between the nodal planes, the planes of grouped beam overlap in that system, there exist anti-nodal regions, in which no beam overlap occurs.

SUMMARY OF THE INVENTION

According to my invention, I have recognized that cross-talk in such a spatially-multiplexed optical communication system can be substantially reduced inserting saturable absorption cells in the anti-nodal regions, in which the beams are spatially distinct. This technique removes the weak edges of each beam, which may include scattered and distorted components not resolvable from the other beams at a detector array. In a pulse-code-modulation (PCM) version of the invention, the saturable absorption cells sharpen the pulses time-wise as well as space-wise and remove noise between the pulses.

Advantageously, a system according to my invention need not employ grouping of all N beams into groups of less than all of them.

DETAILED DESCRIPTION

Figure 1:
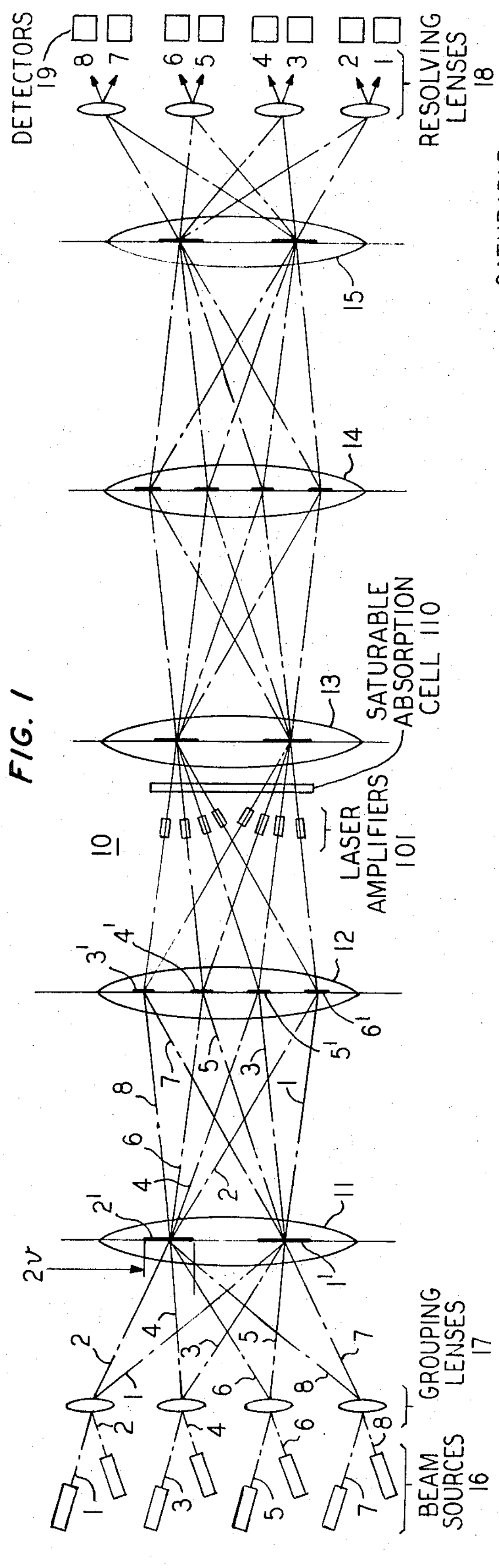
FIG. 1 shows in partially pictorial and partially block diagrammatic form a spatially-multiplexed beam transmission system in accordance with the present invention employing confocally-spaced lenses.

Referring to the drawings, FIG. 1 shows a spatially multiplexed beam transmission system in accordance with the present invention. For purposes of illustration and explanation, the optical guiding apparatus 10 is shown comprising a sequence of five confocally spaced, double convex lenses 11, 12, 13, 14 and 15. At the input end, a plurality of eight beam sources 16, such as lasers and associated means for modulating the laser light with information signals, generate eight beams 1 through 8 represented by the correspondingly identified rays. The optical beams are organized into four groups of two beams each by means of four lens, identified as grouping lenses 17. The grouping lenses are arranged so that one beam 1, 3, 5 and 7 from each of four different sources is directed onto a common region 1' of the first lens 11 in the sequence. Similarly, beams 2, 4, 6 and 8 are directed onto another common region 2' of lens 11. The plane in which the common regions lie is referred to as the nodal plane. In the system of FIG. 1, the nodal planes are also the planes of the confocally spaced lenses.

Each of the common regions has a diameter $2\nu$, corresponding to the width of the multiplexed beams at lens 11. How closely these common regions can be spaced and, hence, the overall lens size is determined by the tolerable crosstalk. For convenience, each beam can be considered to be $k$ times greater than its $1/e^2$ - width (assuming a Gaussian beam profile), where $k$ is chosen such that the crosstalk requirement is met when the common regions just touch. In practice, the main source of crosstalk is due to beam distortion and scattering, rather than the spread of the ideal beam. The factor $k$, therefore, will vary from guide to guide, according to the tolerances of the guiding components.

Upon traversing the first lens, the beams regroup by virtue of the deflection produced by the lens, into four groups of two beams each at the next lens 12. As above, each of the four newly formed groups includes one beam from each of the two groups formed at lens 11. Thus, for example, beams 7 and 8 form one group at a common region 3' on lens 12, while beams 5 and 6, 3 and 4, and 1 and 2 form the remaining groups at common regions 4', 5' and 6', respectively. It will be noted that, in essence, the grouping lenses 17 are imaged at lens 12 by lens 11.

The process of grouping and regrouping the beams is repeated and continues along the waveguide. This process is automatic and is a result of the focusing action of the lenses.

The beams are resolved at any position along the waveguide by means of a group of resolving lenses 18 located at one of the nodal planes. In the illustrative embodiment of FIG. 1, a group of four resolving lenses 18 are located at the nodal plane following lens 15. The resolving lenses intercept the four groups of beams derived from lens 15 and redirect them along eight separate paths, corresponding to the eight input beams 1–8. The resolving lenses would typically be followed by optical detectors 19 or receivers.

Disposed between lenses 12 and 13 in a region in which the beams spatially distinct are laser amplifiers 101 and a saturable absorption cell 110, which reduces cross-talk between the modulated light beams. The regions where the beams are spatially distinct are the anti-nodal regions. These regions appear greatly fore-shortened in the drawing because the lens spacings are reduced in order to provide an adequate showing of the system. Nevertheless, such regions do exist in the system of FIG. 1 and are suitable for the insertion of laser amplifiers 101 and saturable absorption cell 110.

Specifically, the sources 16 illustratively supply beams at 10.6 microns from carbon dioxide molecular lasers, which are now well known in the art, modulated to have signal bandwidths of about 10 megaHertz (1 Hertz = 1 cycle per second). Since a PCM system is preferred, the corresponding bit rate is about $10^7$ bits per second ($10^7$ pulses per second).

The laser amplifiers 101 are conventional carbon dioxide laser amplifiers which may be the same as the original laser beam sources, except that no resonators are employed. Each includes a lens (or lenslet of a lenslet array) at its output to focus the beam to the diffraction-limited diameter of about 20 microns. Illustratively, the gain supplied by amplifiers 101 would be sufficient to raise the intensity per unit area of the focused beams to about $1 \times 10^5$ watts per square centimeter in cell 110. Typically, this would require about a one-watt output from each amplifier and is readily achieved.

The saturable absorption cell 110 illustratively has anti-reflection-coated windows and includes sulfur hexafluoride ($SF_6$) gas at a pressure of several atmospheres, illustratively about three atmospheres. The pathlength in the $SF_6$ is about 20 microns to confine the saturable absorption to the focal region. A lenslet array (not shown) typically would be disposed at the output side of cell 110 to restore the divergence angles for the beams which are characteristic of the confocal spacing of lenses 11, 12, 13, 14 and 15.

It should be noted that all of the lenses and windows in the system are made of material transmissive to 10.6 microns, such as pressed polycrystalline zinc sulfide.

Assuming a spacing of the confocal lenses 11 through 15 of about 20 meters, lens diameters of 20 centimeters, and calling the combination of laser amplifiers and saturable absorber a repeater, I suggest spacing the repeaters about every three miles in the guiding apparatus 10.

In the operation of the embodiment of FIG. 1, the amplifiers 101 raise the intensity per unit area to a level producing saturable absorption in cell 110. Saturable absorption is a well known type of absorption. The absorption is greatest, and transmission lowest, when the so-called saturation level has not been reached. When and where the supplied light intensity per square centimeter exceeds the saturation level, the absorber is quickly rendered essentially transparent. The weak edges of the beams, which may have resulted from distortions and scattering, and which do not exceed the selected level, are removed. Also, the leading and trailing edges of the pulses are sharpened, and noise between them is removed, since only intensities exceeding the selected level are passed. The central portion of each pulse, space-wise, saturates the absorber and suffers a relatively small percentage of attenuation. Cross-talk between the beams is reduced. They may be more easily resolved by resolving lenses 18.

It should readily be appreciated that a system according to my invention can be implemented at any desired optical wavelength and is not limited to operation at 10.6 microns in the far infrared. Many suitable laser sources, amplifiers and saturable absorbers are available at other wavelengths.

An advantageous form of the PCM embodiment of FIG. 1 is provided by mutually adapting the cascaded amplifiers and absorption cell to make the selected saturation level exceed by a small factor an expected noise level associated with the transmitted optical pulses, the amplifiers and cells simultaneously sharpening the pulses space-wise and time-wise. Of course, the selected saturation level is less than the expected pulse height.

Figure 2:
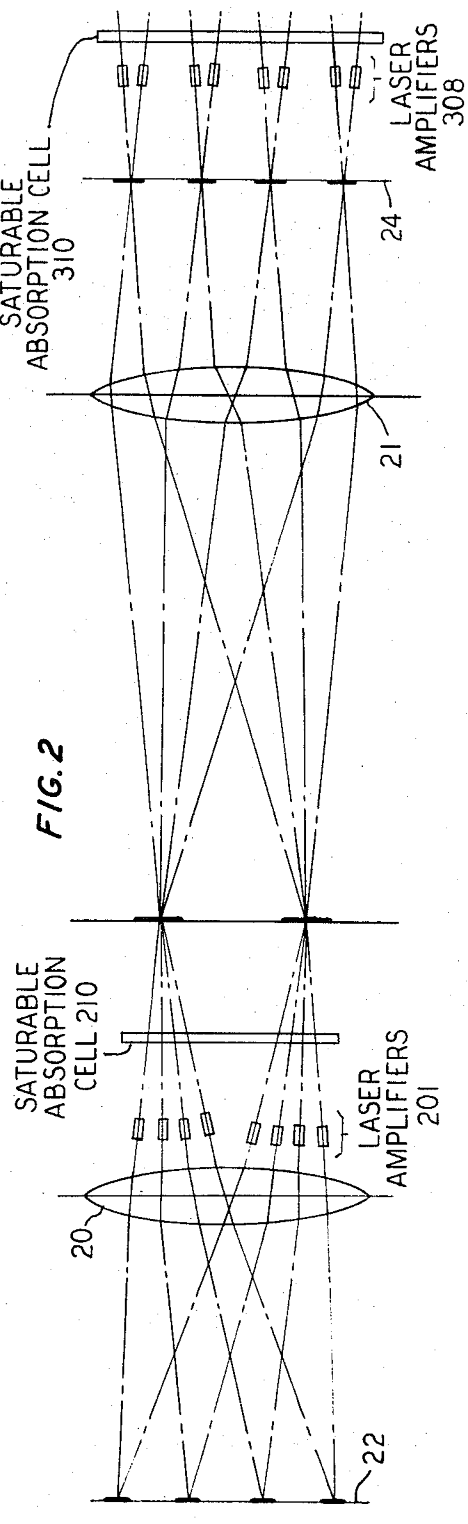
FIG. 2 shows a modification of that system wherein the lenses are not confocally spaced.

In the illustrative embodiment of FIG. 1 the lenses are confocally spaced and the nodal planes are formed in the planes of the lenses. While there are advantages to such an arrangement, confocal spacing is not a necessary condition. In general, the lens-to-lens spacing $d$ may deviate from the confocal spacing $2f$ by as much as $\pm$ 10 percent without impairing the operation of the system. In such an arrangement, however, the nodal planes are formed between the lenses, as indicated in FIG. 2. This figure shows two lenses 20 and 21, and the common regions located in three nodal planes 22, 23 and 24 between the lenses. Laser amplifiers 201 and 308 and saturable absorber 210 and 310, similar to those of FIG. 1, are disposed in anti-nodal regions.

The relationship between the system parameters and the maximum number of beams is given by:

$$N = \pi^4 A^4 / 32 k^4 \lambda^2 \Delta^2, \quad (1)$$

and $$\Delta = d / \sin \Phi, \quad (2)$$

where $\lambda$ is the wavelength of the guided wave energy, $A$ is the lens radius, $k$ is the factor by which each beam exceeds its $1/e^2$ Gaussian width, and $$\Phi = \cos^{-1}(1 - d/2f). \quad (2)$$

The beam radii $\mu$ and $\nu$ at successive lenses are related by $$\nu = \Delta\lambda / \pi\mu. \quad (4)$$

In FIG. 1 and FIG. 2 the beams are represented by rays, and the effective beam widths at the lenses are represented by the heavy solid lines in the lenses. It should be understood that the beams obey the law of diffraction between lenses, where it is inconvenient to show the actual beam shapes.

Figure 3:
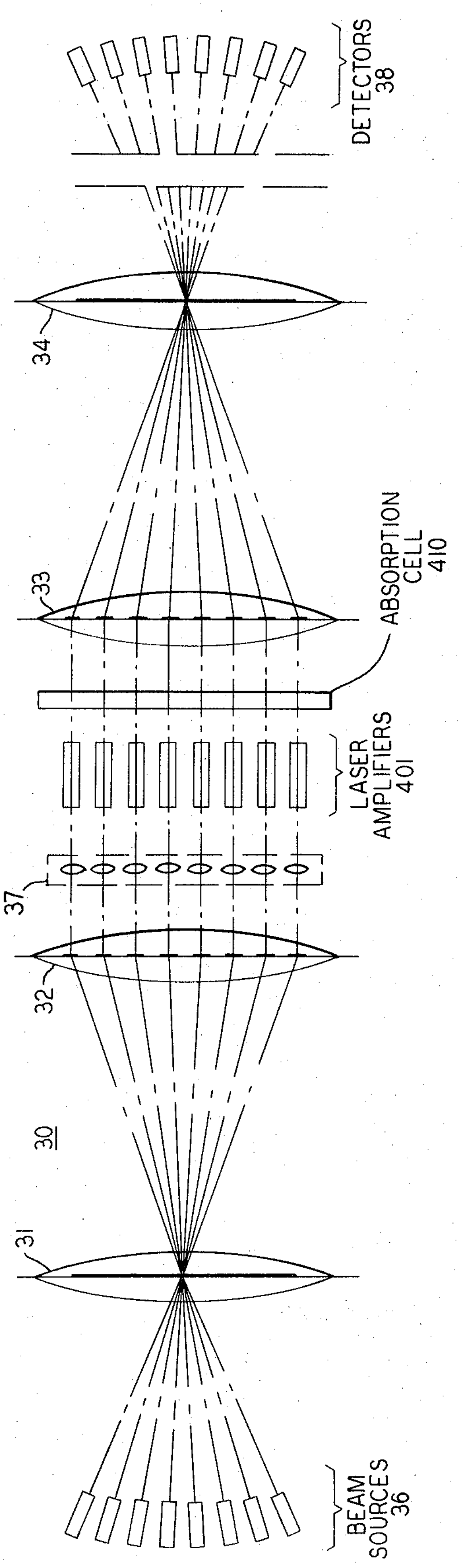
FIG. 3 shows a further modification of the system of FIG. 1 wherein all beams overlap at alternate lenses.

In FIG. 3 which shows connected portions of one optical guiding apparatus 30, a partly confocal, partly non-confocal arrangement is shown in which the beam-grouping technique of the above-cited Gloge et al application is not employed.

The beam sources 36 may be similar to beam sources 16 of FIG. 1, except they are all adapted to illuminate practically the full area of the first guiding lens 31. The corresponding ray paths, as shown in FIG. 3, intersect at the center of lens 31. Anti-nodal regions then occur in the vicinity of the following confocally spaced lens 32. Thus, laser amplifiers 401 and absorption cell 410, similar to those of FIG. 1, are disposed in the vicinity of lens 32, where they are adapted and operate substantially as in FIG. 1. To provide greater path length of distinct beams to facilitate amplification, lenslet array 37 renders the beams parallel and collimated.

As in FIG. 1, a lenslet array (not shown) may be disposed before absorption cell 410 to provide diffraction-limited spot sizes therein; and another lenslet array (not shown) may be employed after cell 410 to restore desired beam shapes. A lens similar to lens 37 could also be used in the embodiments of FIGS. 1 and 2. The next following lens 33 has a focusing power adapted to restore appropriate beam shape and direction for confocal lens spacing thereafter, e.g., between lenses 33 and 34. Additional combinations of amplifiers like amplifiers 401 and absorption cells like cell 410 are inserted in guiding apparatus 30 at intervals as required to maintain cross-talk sufficiently low at detectors 38. Detectors may be of conventional type suitable for optical receivers. They may also include resolving lenses similar to lenses 18 of FIG. 1. Also, many sets of amplifiers may be used without absorption cells. For example, amplifiers every three miles and amplifier-absorption cell combinations every hundred miles appear to be an advantageous modification for some applications.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. Optical communication apparatus comprising a plurality of optical transmitters arranged in an array to provide initially distinct beams, a plurality of detectors arranged in an array at a location remote from said transmitters, a plurality of lenses disposed in tandem with respective ones of said transmitters to direct a plurality of said initially distinct beams to overlap in at least a first region between said transmitters and said detectors, a plurality of axially spaced means between said lenses and said detectors for focusing said beams to image said transmitters upon respective ones of said detectors, and means between the axially spaced means at second regions in which said beams are spatially distinct for absorbing portions of said beams below a selected level and passing the portions of said beams above said selected level.

2. Optical communication apparatus according to claim 1 in which the absorbing means comprise at least one cell containing saturable absorbing material.

3. Optical communication apparatus according to claim 2 including a plurality of coherent light amplifiers cascaded with said cell in the second in which the beams are spatially distinct.

4. Optical communication apparatus according to claim 3 in which the transmitters comprise optical pulse-code-modulation transmitters, the cascaded amplifiers and absorption cell being mutually adapted to make the selected level exceed an expected noise level associated with the optical pulses, said amplifiers and cells simultaneously sharpening the pulses space-wise and time-wise.

5. Optical communication apparatus according to claim 1 including a plurality of means interspersed with said focusing means at axially spaced different second regions in which said beams are spatially distinct for absorbing portions of said beam below selected levels and passing portions of said beams above said selected levels.

* * * * *